(12) United States Patent
Dickson et al.

(10) Patent No.: US 11,889,244 B2
(45) Date of Patent: *Jan. 30, 2024

(54) PASSIVE OPTICAL NETWORK FOR UTILITY INFRASTRUCTURE RESILIENCY

(71) Applicant: Commonwealth Edison Company, Chicago, IL (US)

(72) Inventors: Andrew Dickson, Chicago, IL (US); Michael Kuberski, Chicago, IL (US); Steven Offner, Chicago, IL (US)

(73) Assignee: Commonwealth Edison Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,150

(22) Filed: May 10, 2022

(65) Prior Publication Data

US 2022/0417626 A1 Dec. 29, 2022

Related U.S. Application Data

(63) Continuation of application No. 17/222,710, filed on Apr. 5, 2021, now Pat. No. 11,356,756.

(51) Int. Cl.
*H04Q 11/00* (2006.01)
*H04B 10/038* (2013.01)
*H04L 45/24* (2022.01)

(52) U.S. Cl.
CPC ....... *H04Q 11/0067* (2013.01); *H04B 10/038* (2013.01); *H04L 45/245* (2013.01); *H04Q 2011/0081* (2013.01)

(58) Field of Classification Search
CPC .......................... H04Q 11/0067; H04B 10/038
See application file for complete search history.

(56) References Cited

U.S. PATENT DOCUMENTS

| | | |
|---|---|---|
| 7,634,160 B2 | 12/2009 | Li et al. |
| 11,356,756 B1 * | 6/2022 | Dickson ................ H04L 45/245 |
| 2004/0004538 A1 | 1/2004 | Manis et al. |
| 2005/0249119 A1 * | 11/2005 | Elie-Dit-Cosaque ....................... H04L 12/2856 370/216 |
| 2006/0192672 A1 | 8/2006 | Gidge et al. |
| 2007/0093995 A1 | 4/2007 | Mollenkopf et al. |
| 2018/0351686 A1 * | 12/2018 | Busi ................... H04J 14/0273 |
| 2019/0089627 A1 * | 3/2019 | Mirsky ................ H04L 45/741 |

OTHER PUBLICATIONS

International Search Report and Written Opinion issued in related application No. PCT/US2022/022915 dated Apr. 22, 2022.

* cited by examiner

*Primary Examiner* — Shi K Li
(74) *Attorney, Agent, or Firm* — Ballard Spahr LLP

(57) ABSTRACT

A secure tiered, robust, and deterministic converged communications architecture with the capacity to support a plurality of power distribution automation devices/components with fiber-enabled fail-over protection is described.

19 Claims, 11 Drawing Sheets

| Traffic | Fault | Time (ms) | Notes |
|---|---|---|---|
| Goose IEC-61850 | Pull Working PON (10 CPEs) | <11 | |
| | Pull Working PON (10 CPEs) | <9 | |
| | Pull Working PON (20 CPEs) | <15 | |
| | Bottom Leaf - Spine | <10 | |
| | Top Leaf - Spine | <10 | |
| | Double fault: 2 & 5 | <13 | |
| SV IEC-61850 | Pull Working PON (10 CPEs) | <11 | |
| | Pull Working PON (10 CPEs) | <9 | |
| | Pull Working PON (20 CPEs) | <15 | |
| | Bottom Leaf - Spine | <10 | |
| | Top Leaf - Spine | <10 | |
| | Double fault: 2 & 5 | <13 | |

*all blue needs to be in <15ms*

| Traffic | Fault | Time (ms) | Notes |
|---|---|---|---|
| Client - Server Unicast IEC-61850 | Pull Working PON (10 CPEs) | <10 | |
| | Pull Working PON (10 CPEs) | <10 | |
| | Pull Working PON (20 CPEs) | <20 | |
| | Bottom Leaf - Spine | <10 | |
| | Top Leaf - Spine | <10 | |
| | Double fault: 2 & 5 | <12 | |
| Client - Client Unicast DNP3 | Pull Working PON (10 CPEs) | <11 | |
| | Pull Working PON (10 CPEs) | <11 | |
| | Pull Protect PON (20 CPEs) | <15 | 25% between 15 and 32 |
| | Bottom Leaf - Spine | <15 | |
| | Top Leaf - Spine | <10 | |
| | Double fault: 2 & 5 | <11 | |

FIG. 7

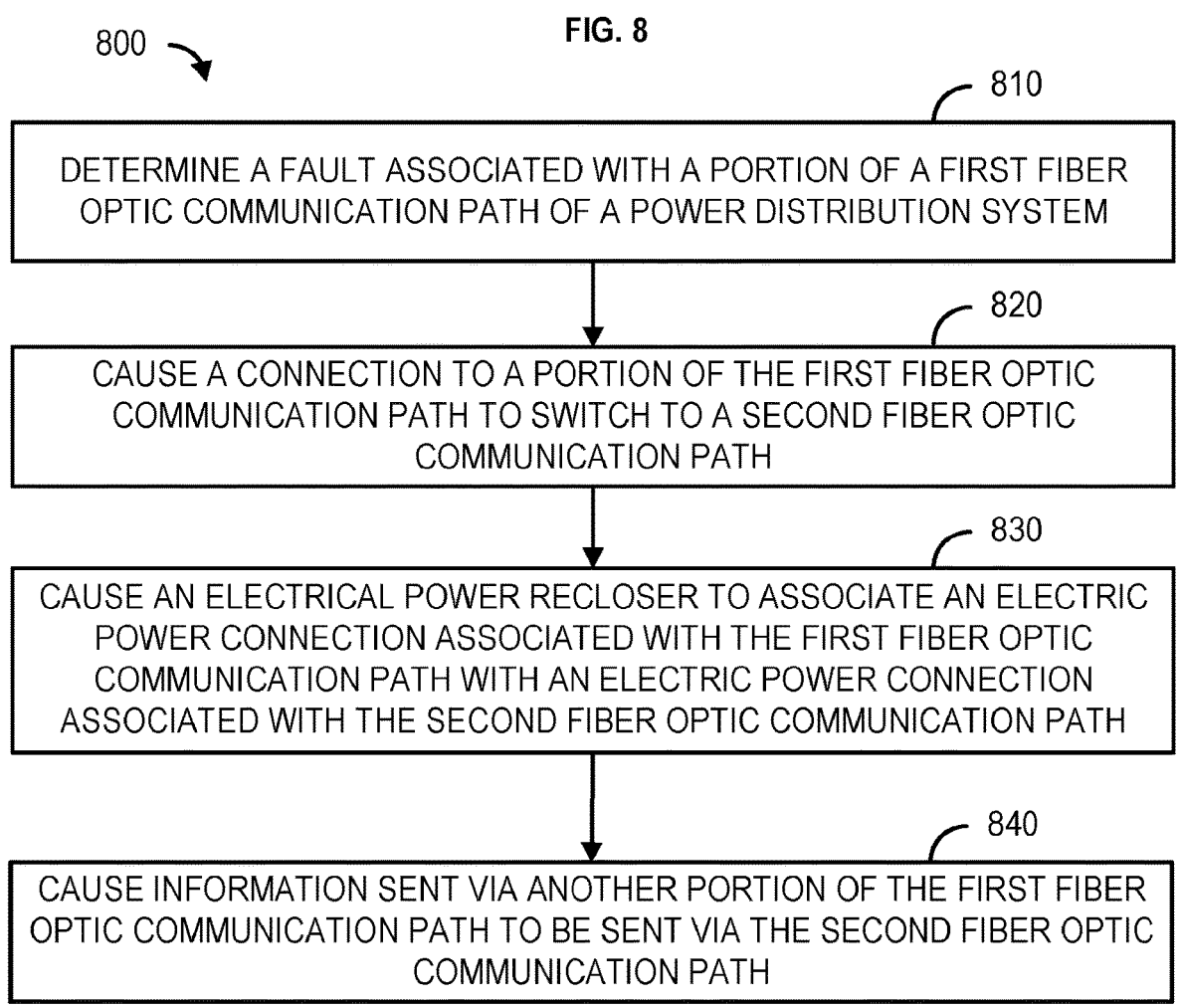

PASSIVE OPTICAL NETWORK FOR UTILITY INFRASTRUCTURE RESILIENCY

CROSS-REFERENCE TO RELATED APPLICATIONS

This application is a continuation of U.S. application Ser. No. 17/222,710, filed Apr. 5, 2021, the contents of which are incorporated herein by reference in their entirety.

BACKGROUND

Maintaining data integrity and the highest system availability are mission-critical objectives for power distribution systems. For example, substations and associated devices/components require zero recovery time redundancy to achieve uninterrupted power supply to end-users. As traditional infrastructures become outdated, the integrity of power distribution systems becomes compromised. Power distribution systems with advanced sensing, communications, and rapid fail-over protection are required.

SUMMARY

It is to be understood that both the following general description and the following detailed description are exemplary and explanatory only and are not restrictive. Methods and systems for passive optical network (PON) for utility infrastructure resiliency are described.

Described are methods comprising: determining, by at least one optical communication node of a plurality of optical communication nodes in communication with an electrical substation power distribution system, a fault associated with a portion of a plurality of portions of a first fiber optic communication path associated with the power distribution system, wherein each optical communication node of the plurality of optical communication nodes is in communication with at least a portion of the plurality of portions of the first fiber optic communication path and at least one electrical power recloser associated with the at least the portion of the first fiber optic communication path; causing, based on the fault, a connection to the portion of the first fiber optic communication path to switch to a connection to a portion of a plurality of portions of a second fiber optic communication path associated with the power distribution system; causing the at least one electrical power recloser to associate an electric power connection associated with the portion of the first fiber optic communication path with the portion of the second fiber optic communication path; and causing information sent via at least another portion of the plurality of portions of the first fiber optic communication path to be sent via the portion of the second fiber optic communication path.

Also are described are methods comprising: determining, by a first optical communication node of a plurality of optical communication nodes in communication with a substation power distribution system, a fault associated with a second optical communication node of the plurality of optical communication nodes, wherein the second optical communication node is associated with a portion of a plurality of portions of a first fiber optic communication path associated with the power distribution system; and causing, based on the fault, information sent to the second optical communication node via the first fiber optic communication path to be sent to the first optical communication node via a second fiber optic communication path associated with the power distribution system.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples, and together with the description, serve to explain the principles of the methods and systems:

FIG. 7 shows example system testing results;
FIG. 8 shows an example method.

DETAILED DESCRIPTION

Figure 1:
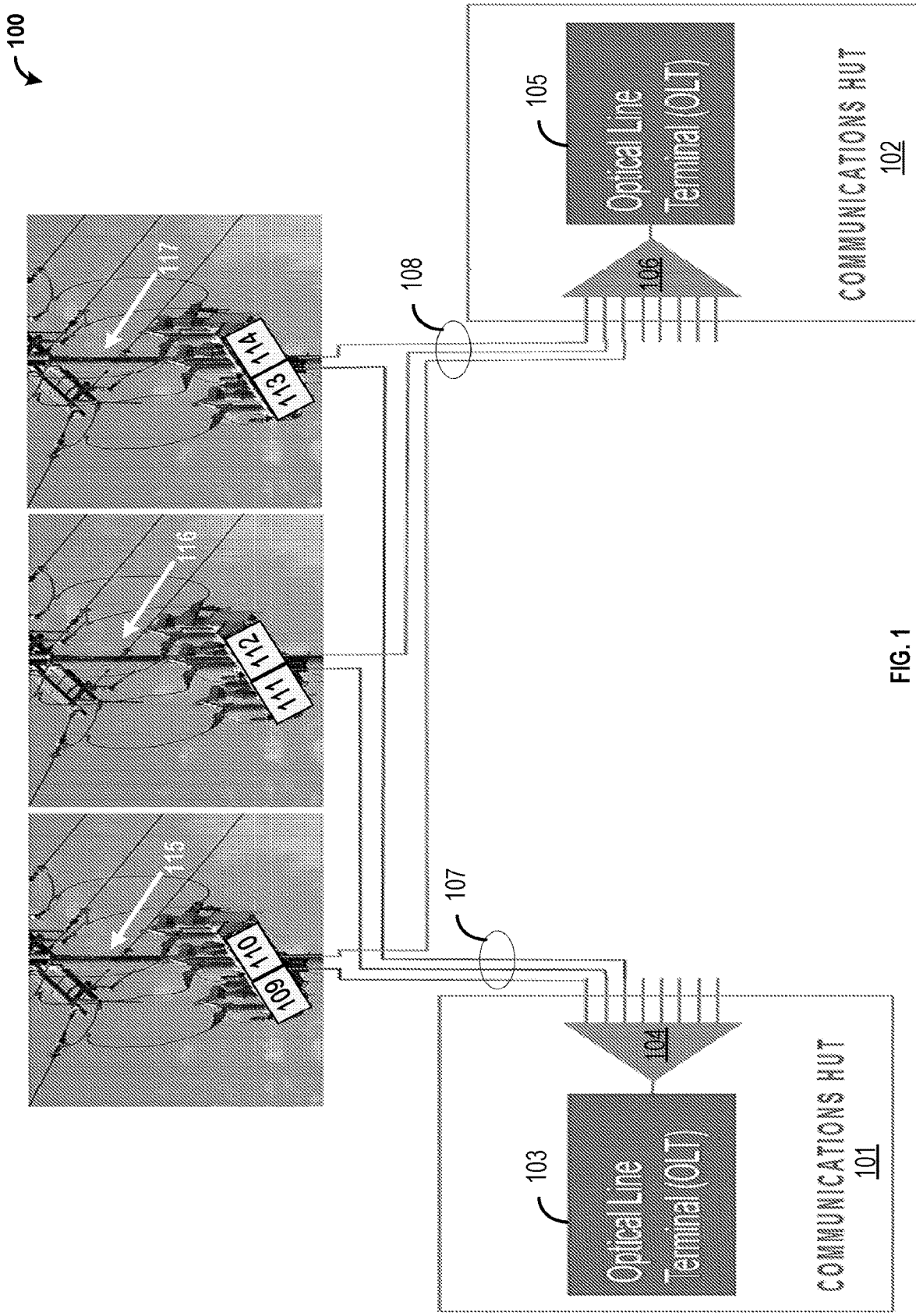
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

A passive optical network (PON) for utility infrastructure resiliency, as described herein is a communications infrastructure configured to provide a secure tiered, robust, and deterministic converged communications architecture. The systems described support and/or provide infrastructure for, for example, power distribution automation (DA), voltage optimization (VO), advanced metering infrastructure (AMI), and/or any other utility applications. A PON-enabled core communications network may, for example, provide a primary path to a network management device(s) (e.g., a data center device, a network operations center (NOC) device, hut device, etc.) and enable rapid data (e.g., Generic Object Oriented Substation Events (GOOSE) data, Generic Substation State Events (GSSE) data, enterprise applications, etc.) communication and failover support between substations and/or associated components (e.g., optical line terminating (OLT), optical network terminals (ONT) devices, end-point devices, etc.). For example, the systems described herein may operate with data rates between nodes (e.g., leaf devices, spine devices, CPE, etc.) of less than 10 milliseconds with failover response (e.g., protection switching, etc.) times of less than 15 milliseconds. The core is very robust with no single points of failure.

A passive optical network (PON) for utility infrastructure resiliency describes a system that contains redundant management and control of devices, such as power distribution automation (DA) equipment and/or the like. In the event of a disaster that makes a component of the system, such as a communications hut/shelter inoperable, another component, such as another a communications hut/shelter, at a different location, takes over the communications to the power distribution automation (DA) equipment, and/or any other device, component, equipment, and/or resource of the system to ensure management and control. The system may utilize a multi-ring structure that includes at least primary and secondary fiber optic signal paths (e.g., via 1GE protected links, 10GE protected links, etc.) that are monitored and managed. For example, the system may include a self-healing, two-fiber, path protection switched ring configuration. The path protection switched ring configuration may include, for example, at least two transmitter/receiver sets per location/node with at least one transmitter/receiver set for each direction in a ring. For example, each location/node of a ring may include one or more circuits of a plurality of circuits (and/or communication configurations) that interconnect and/or are in communication with the ring. Transmit and receive directions for each circuit of the plurality of circuits may propagate over the same path around the ring. In event of a single fiber failure (and/or any other problem/issue, etc.) that affects one direction of transmission only, both transmit and receive portions of selected circuits shall be able to switch simultaneously to minimize propagation delay differences between transmit and receive.

The system may support multiple configurations, such as, for example, tree configurations, linear configurations, ring (e.g., multi-ring, etc.) configurations, ring spur configurations, and/or the like. The system may, for example, support any industry-standard protocols and operate in a deterministic manner that enables a clear understanding of latency, throughput, capacity, routing algorithms, peer-to-peer communications, data prioritization, encryption, and failover schemes.

FIG. 1 shows a system 100 that may be configured with/as a passive optical network (PON) for utility infrastructure resiliency. The system 100 shows communication huts (e.g., communication shelters, etc.) 101 and 102. The communication huts 101 and 102 may each include a plurality of devices/components (e.g., optical line terminal device, Gigabit switches (leaf/spine), electrical equipment, smart grid devices, distribution automation devices, utility control and/or facilitating devices, etc.). For example, the communication hut 101 may include an optical line terminal (OLT) 103 that connects to a passive optical splitter/combiner 104, and the communication hut 102 may include an optical line terminal (OLT) 105 that connects to a passive optical splitter/combiner 106. The OLTs 103 and 105 may be common aggregation points for communications/services from field devices/assets, such as optical network terminals, end access devices, and/or the like. The OLTs 103 and 105 may provide redundancy and/or fail-over protection for each other. For example, if the OLT 103 is impaired, inoperable, and/or malfunctioning, the OLT 105 may take over communications and/or services provided/executed by the OLT 103 and vice versa. For example, the OLTs 103 and 105 may each communicate with the splitters/combiners 104 and 106, respectively, to connect and/or communicate with optimal network terminals (ONTs) 109-114 via protected fiber optic communication lines/connections 107 and 108. The splitters/combiners 104 and 106 create/enable fiber optic physical access for multiple ONTs to share a single OLT and may be configured for bidirectional communications, shared communications, single trunk fiber optical communications, and/or the like.

ONTs may be, for example, configured on a pole. For example, the ONTs 109-114 may be located on utility poles distributed throughout an area and/or region. For example, ONTs 109-110 may be located on a utility pole 115, ONTs 111-112 may be located on a utility pole 116, and ONTs 113-114 may be located on a utility pole 117. For each utility pole, an ONT may be a primary ONT and another ONT may be a secondary ONT. The ONTs 109 and 110 may provide redundancy and/or fail-over protection for each other. For example, if the ONT 109 is impaired, inoperable, and/or malfunctioning, the ONT 110 may take over communications and/or services provided/executed by the ONT 109 and vice versa. The ONTs 111 and 112 may provide redundancy and/or fail-over protection for each other. For example, if the ONT 111 is impaired, inoperable, and/or malfunctioning, the ONT 112 may take over communications and/or services provided/executed by the ONT 111 and vice versa. The ONTs 113 and 114 may provide redundancy and/or fail-over protection for each other. For example, if the ONT 113 is impaired, inoperable, and/or malfunctioning, the ONT 114 may take over communications and/or services provided/executed by the ONT 103 and vice versa.

The ONTs 109-114 may each have a small footprint with an ability to be configured as/with distribution automation devices and endpoint devices. For example, the system 100, via use of PON and ONTs for network applications, utilizes less IP addressing at each endpoint when compared to utilizing routers deployed at each endpoint.

The ONTs 109-114 may each have low power consumption and flexible control/configuration options. The ONTs 109-114 may each be temperature hardened (e.g., operating without failure or degradation throughout a temperature range of −40 to +70 degrees C. (−40 to +158 degrees F.) with a relative humidity of 5 to 90% non-condensing, etc.), lightweight, and easy to install (e.g., modular, etc.). For example, no large external cabinet is required to install the ONTs 109-114 on the utility poles 115-117.

Figure 2:
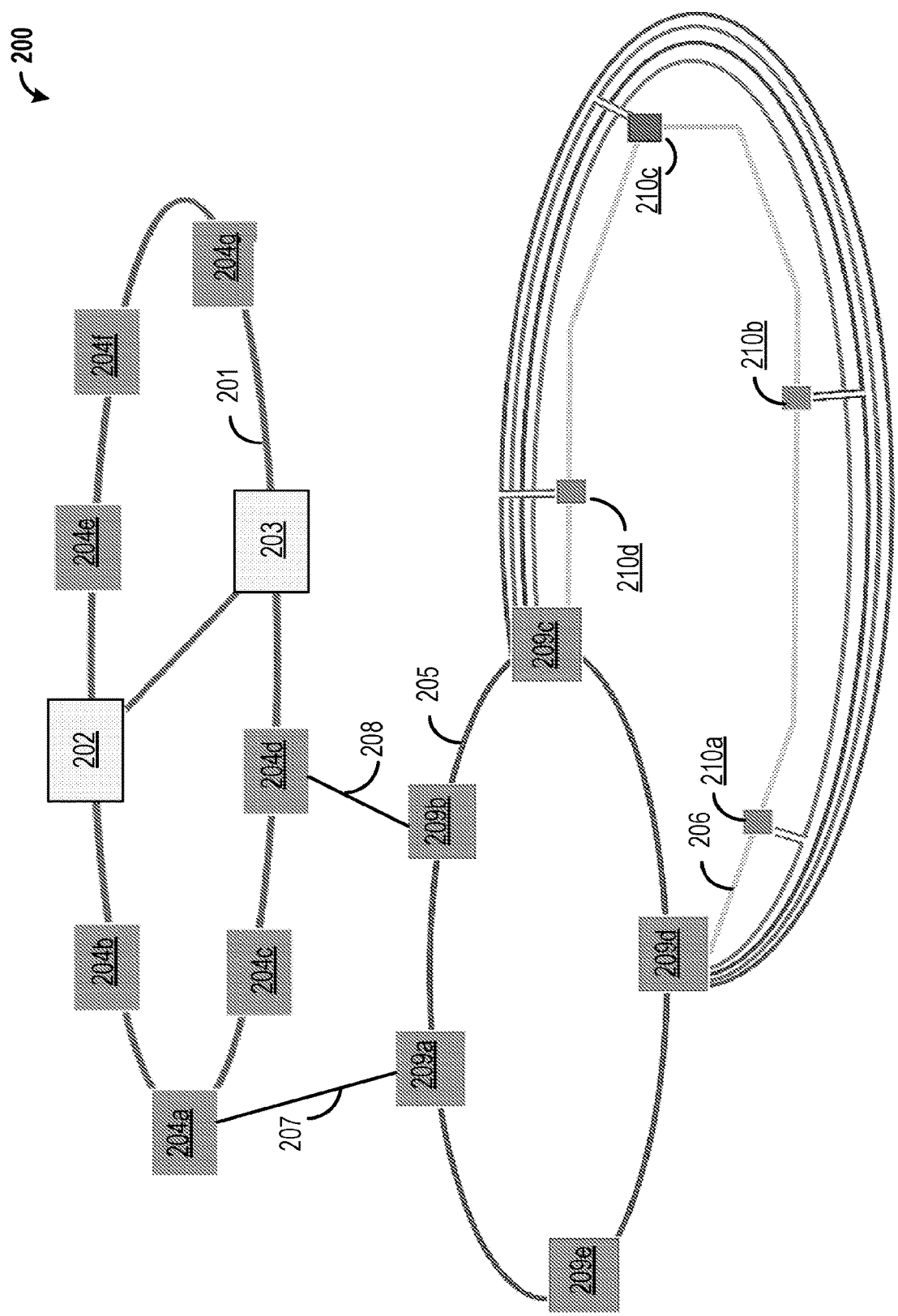
FIG. 2 shows an example system.

FIG. 2 shows an example of a high-level configuration of a passive optical network (PON) for utility infrastructure resiliency. The system 200 may be used to support and scale up communications of increased amount traffic and backup data path(s) of distribution automation devices, after any network issue that redirects traffic to an alternate or protect path.

The system 200 may include a primary backbone 201 (e.g., backbone ring, etc.). The primary backbone 201 may be a high-capacity fiber optic communication path. The primary backbone 201 may be configured to prevent any single point of failure. For example, the primary backbone 201 may connect all primary sites (huts) redundant data centers 202 and 203. The data centers 202 and 203 may provide redundancy and/or fail-over protection for each other. For example, if the data center 202 is impaired, inoperable, and/or malfunctioning, the data center 203 may take over communications and/or services provided/executed by the data center 202 and vice versa.

Smaller regional rings 205 and 206 may connect to the primary backbone 201 via two diverse links 207 and 208 (e.g., fiber links, etc.) to, for example, via communication huts such as huts 204*a* and 204*d*. The regional ring 205 may, for example, be a high speed and/or high capacity fiber communication link and include a plurality of redundant communication huts, for example, communication huts 209*a-e* (e.g., OLT devices, leaf/spine devices, OLTs 104-105, etc.) configured with redundant communication paths. The regional ring(s) 206 may include high speed and/or high capacity fiber communication links and may be configured for power distribution. For example, the regional ring(s) 206 may include a plurality of end access devices 210*a-d* (e.g., power DA devices, ONT devices, ONTs 109-114, etc.) associated with power distribution.

Figure 3:
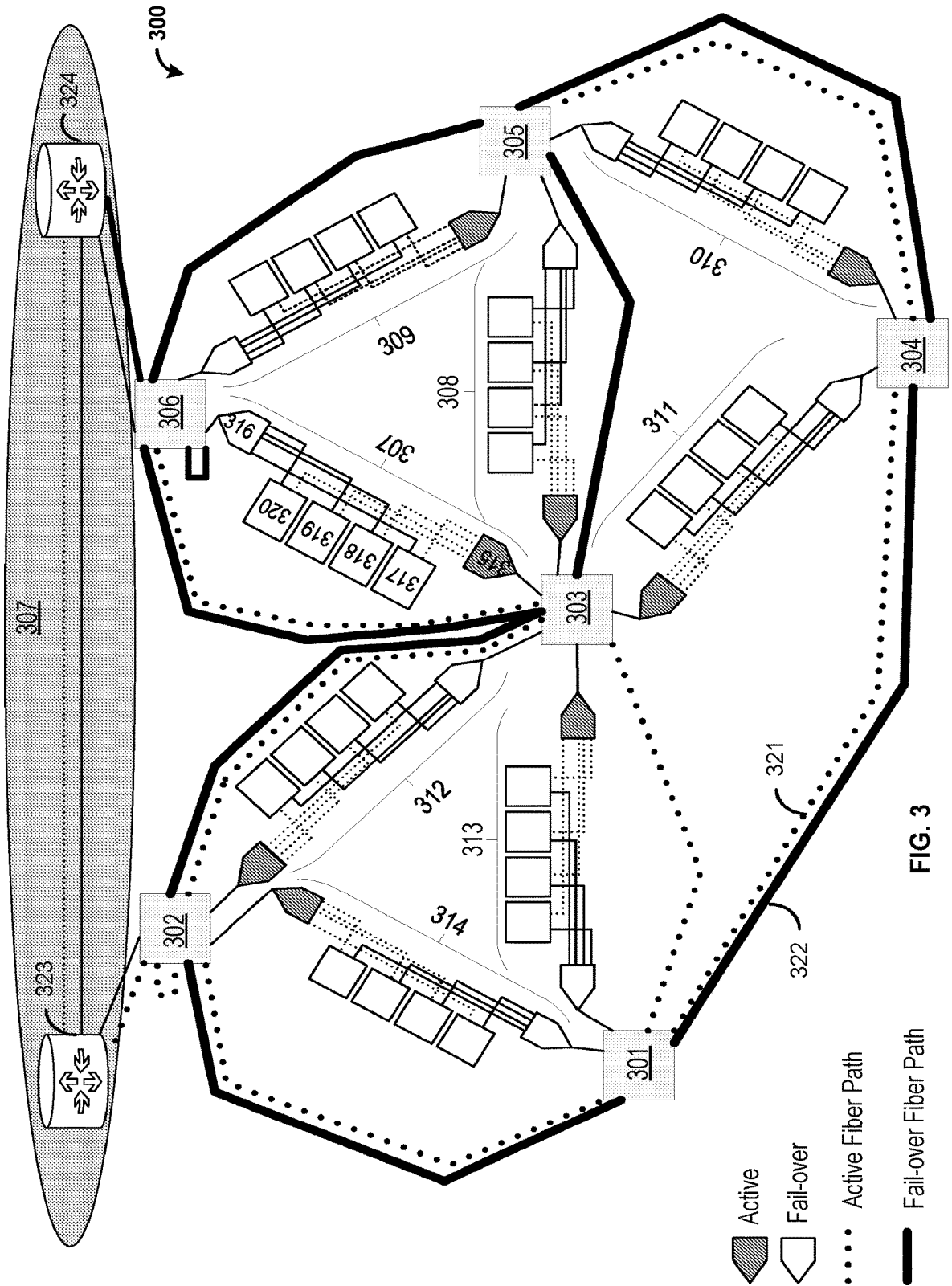
FIG. 3 shows an example system.

FIG. 3 a passive optical network (PON) for utility infrastructure resiliency. A system 300 may include a plurality of communication hut devices 301-306 (e.g., leaf/spine devices, OLT devices, the OLT devices 103 and 105, DA devices 209*a-e*, a network device, etc.) downstream from a substation 307. Although shown as single devices, the communication hut devices 301-306 may each include a plurality of devices. The communication hut devices 301-306 may be located, for example in/at communication huts (e.g., communication shelters, etc.) that each include a plurality of devices/components (e.g., optical line terminal device, Gigabit switches (leaf/spine), electrical equipment, smart grid devices, distribution automation devices, utility control and facilitating devices, etc.). The communication hut devices 301-306 may enable electric power associated with distribution assets to be remotely monitored and coordinated to operate optimally, for example, with or without manual intervention. This includes monitoring the health of Tiers/Layers 1 through 3 communication infrastructure devices, primary and secondary communications paths, together with end-points. Alarms and alerts may be generated and propagated when an infrastructure device or path faults, or traffic pattern change occurs, and maintenance processes (e.g., service fail-over, automated reclosers, etc.) may be executed to quickly address failures. The apparatus of claim may send a notification indicating at least one of a location of a fault, a potential cause of a fault, and an estimated time to repair for a fault For example, each of the communication huts 301-306 may be configured to determine/detect operating conditions of power distributed (e.g., via the substation 307, via a grid, etc.) and adjust operating conditions to improve the overall power flow and optimize performance. Each of the communication huts 301-306 may include a plurality of PON components and/or switching equipment/devices. Each of the communication huts 301-306 may be configured to provide early detection of any device/component that may be impaired, inoperable, and/or malfunctioning, to allowing a utility to replace the device/component before a failure occurs. Each of the communication huts 301-306 may be configured to immediately determine an outage and/or similar event and determine specific devices that may be impaired, inoperable, and/or malfunctioning. The communication huts 301-306 may be configured for redundancy to automatically detect and route around a problem and to ensure power/service restoration. For example, the communication huts 301-306 may each generate continuity check messages (CCM). The communication huts 301-306 may be configured for local switching for all peer-to-peer traffic. During a partial PON failure, peer-to-peer traffic may be switched, for example, by leaf/spine switches of the communication huts 301-306. The system 300 may be configured so that it is dependent on each communication huts and/or associated DA equipment/device to determine that an endpoint device (e.g., ONTs 317-320, etc.) has moved. For example, each DA device may determine a valid/active communication path.

Each of the communication huts 301-306 may be in communication with redundancy units, such as the redundancy units 307-314. Each redundancy unit may be configured, for example, similarly to the system 100. For example, as shown in the redundancy unit 301, each redundancy unit 307-314, may include redundant passive optical splitters/combiners in communication with at least one of the communication huts 301-306. For example, the redundancy unit 307 may include splitters/combiners 315 in communication with communication hut 303 and splitters/combiners 316 (e.g., DA devices, etc.) in communication with communication hut 306. The splitters/combiners of each redundancy unit 307-314 create/enable fiber optic physical access for multiple ONTs, such as ONTs 317-320 (e.g., DA devices, etc.), to share a communication hut (e.g., communication huts 301-306, etc.) and may be configured for bidirectional communications, shared communications, single trunk fiber optical communications, and/or the like. As shown, each redundancy unit 307-314 may include splitters/combiners in with communication with a communication hut (e.g., communication huts 301-306, etc.) with a splitter/combiner, such as the 315, configured (indicated by the gray coloring) to operate along an active/working communication path and a splitter/combiner, such as the 316, configured (indicated by the white coloring) to operate along an inactive/fail-over communication path. For example, the system 300 may include a high speed and/or high capacity fiber active/working communication path/ring 321 and a high speed and/or high capacity fiber inactive/fail-over communication path 322.

The ONTs of each of the redundancy units 307-314 may be, for example, configured on utility poles distributed throughout an area and/or region. The redundancy units 307-314 may provide redundancy and/or fail-over protection for each other.

The substation 307 may include a plurality of substations and/or "drain points." The substation 307 may include a plurality of smart power control and management devices that comply with grid standards. For example, the substation 307 may include at least two diverse and/or redundant routing devices 323 and 324. The routing devices 323 and 324 may be configured to behave as a single logical entity utilizing, for example, MC-LAG (Multi-Chassis Link Aggregation Group), VRRP (Virtual Redundant Routing Protocol), and/or similar methodology.

Figure 4:
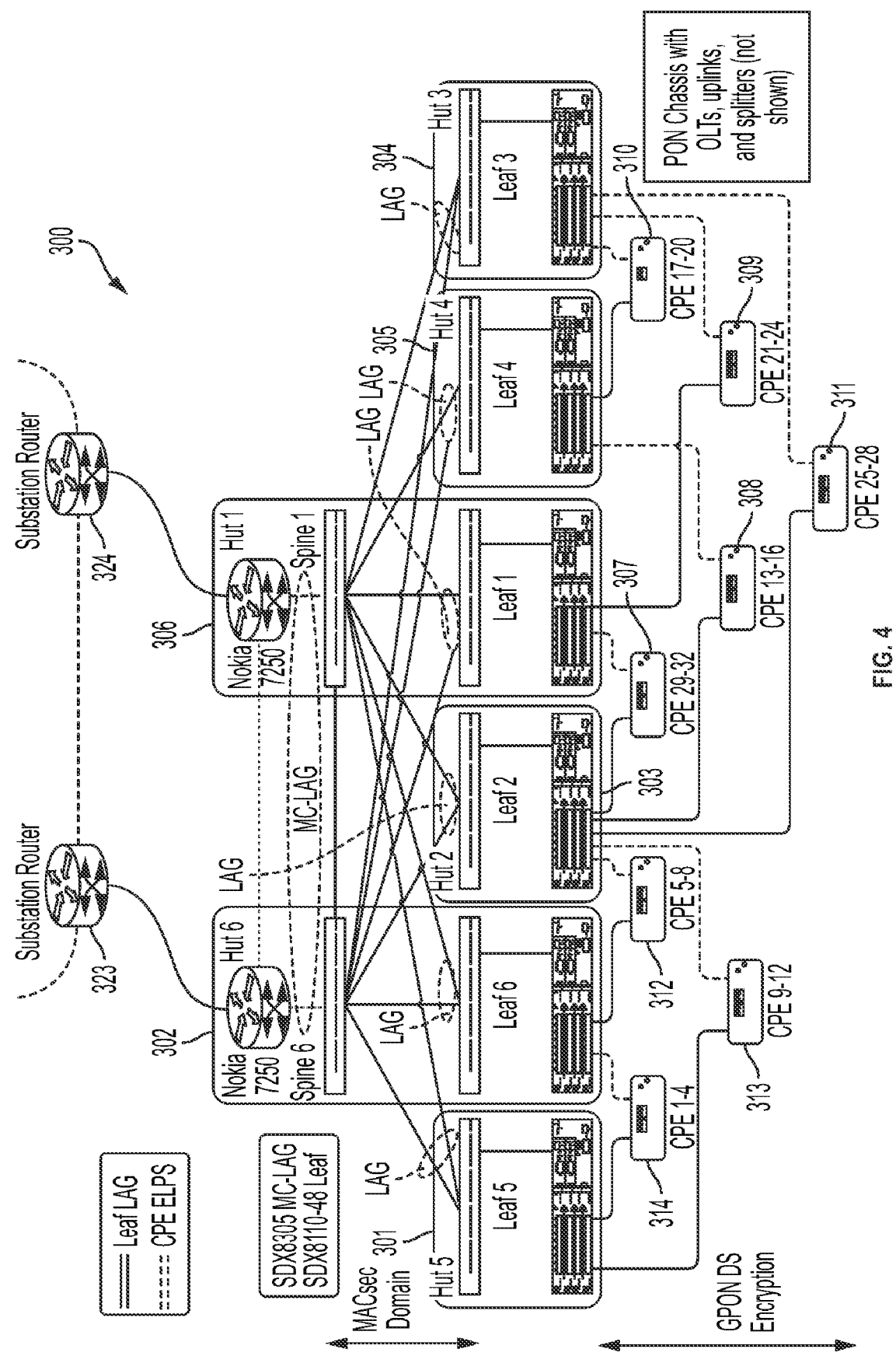
FIG. 4 shows an example system.

FIG. 4 shows an example configuration of the system 300. For example, FIG. 4 shows the system 300 with a spine/leaf architecture. A spine/leaf architecture of the system 300 may be configured with 1:1 Ethernet linear protective switching (ELPS) on each CPE in communication with the redundancy units 307-314. Each CPE may be configured to choose a valid/active communication path. The system 300 may be configured for Multi-chassis LAG to the core network and each additional Leaf switch for adjacent communication huts. The system 300 may be configured for active/Standby LAG. The system 300 may be configured so that continuity check messages (CCM) are generated by the local CPE closest to each communication hut. The system 300 may be configured for link-state awareness on each leaf LAG interface to shut down CCM's if no path to the main spine switches are determined/detected by monitoring physical links to the main spine switches. If a failure is detected, traffic may be forced to a protection path. The system 300 may be configured for local switching within OLTs for all peer-to-peer traffic. During a partial PON failure of the system 300, peer-to-peer traffic may be switched by the leaf/spine switches. The system 300 may be configured so that non-peering traffic exits the network at a spine switch. The system 300 may be configured, for example, for MACSec between the spine/leaf switches and multi-service access nodes.

Figure 5:
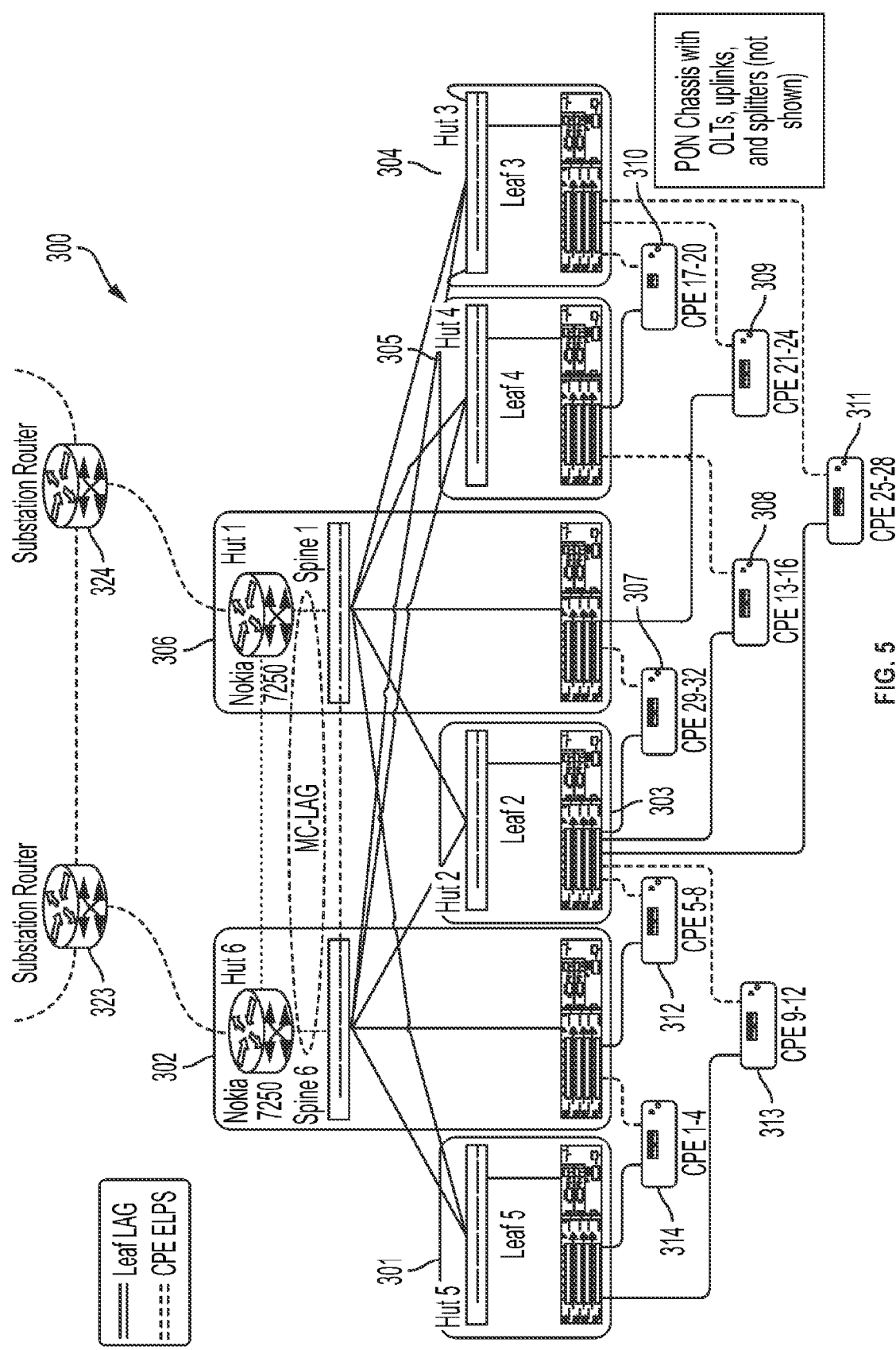
FIG. 5 shows an example system.

FIG. 5 shows an example configuration of the system 300. For example, FIG. 5 shows the system 300 with a root/leaf architecture. A root/leaf architecture of the system 300 may be configured with 1:1 Ethernet linear protective switching (ELPS) on each CPE in communication with the redundancy units 307-314. Ethernet interfaces may provide a bridging function between two or more 1GE, 10GE, 10/100/1000 Mb/s Ethernet/IEEE 802.3 LANs or chassis that are physically separate. The bridge may be protected via a self-healing high speed and/or high capacity fiber ring and it will switch traffic to an alternate path in 5 milliseconds or less upon detection of loss of a working path. The interfaces may serve as intelligent bridges between the chassis, LANs and PON modules, exchanging only frames that are not locally addressed. The Ethernet interfaces may incorporate, in a single module, both the Ethernet function and the multiplexing and VLAN functions to interface to PON network node optical transceiver modules. The Ethernet interfaces may enable a user to assign a payload data rate of between 10 Kb/s and 10 Gb/s (to line rate maximum) for inter-bridge transport, depending on the inter-site Ethernet traffic and the requirement for achieving 1000 M up to 10 Gb/s speeds. 10 Gb/s rates may require the use of multiple, protected 10GE capable switch uplink modules.

Each CPE may be configured to choose a valid/active communication path. The system 300 may be configured for Multi-chassis LAG to the core network and each additional Leaf switch for adjacent communication huts. The system 300 may be configured for active/Standby LAG. The system 300 may be configured so that continuity check messages (CCM) are generated by the local CPE closest to each communication hut. The system 300 may be configured for link-state awareness on each leaf LAG interface to shut down CCM's if no path to the main spine switches are determined/detected by monitoring physical links to the main spine switches. If a failure is detected, traffic may be forced to a protection path. The system 300 may be configured for local switching within OLTs for all peer-to-peer traffic. During a partial PON failure of the system 300, peer-to-peer traffic may be switched by the leaf/spine switches. The system 300 may be configured so that non-peering traffic exits the network at a spine switch. The system 300 may be configured, for example, for MACSec between the spine and leaf switches.

Figure 6A:
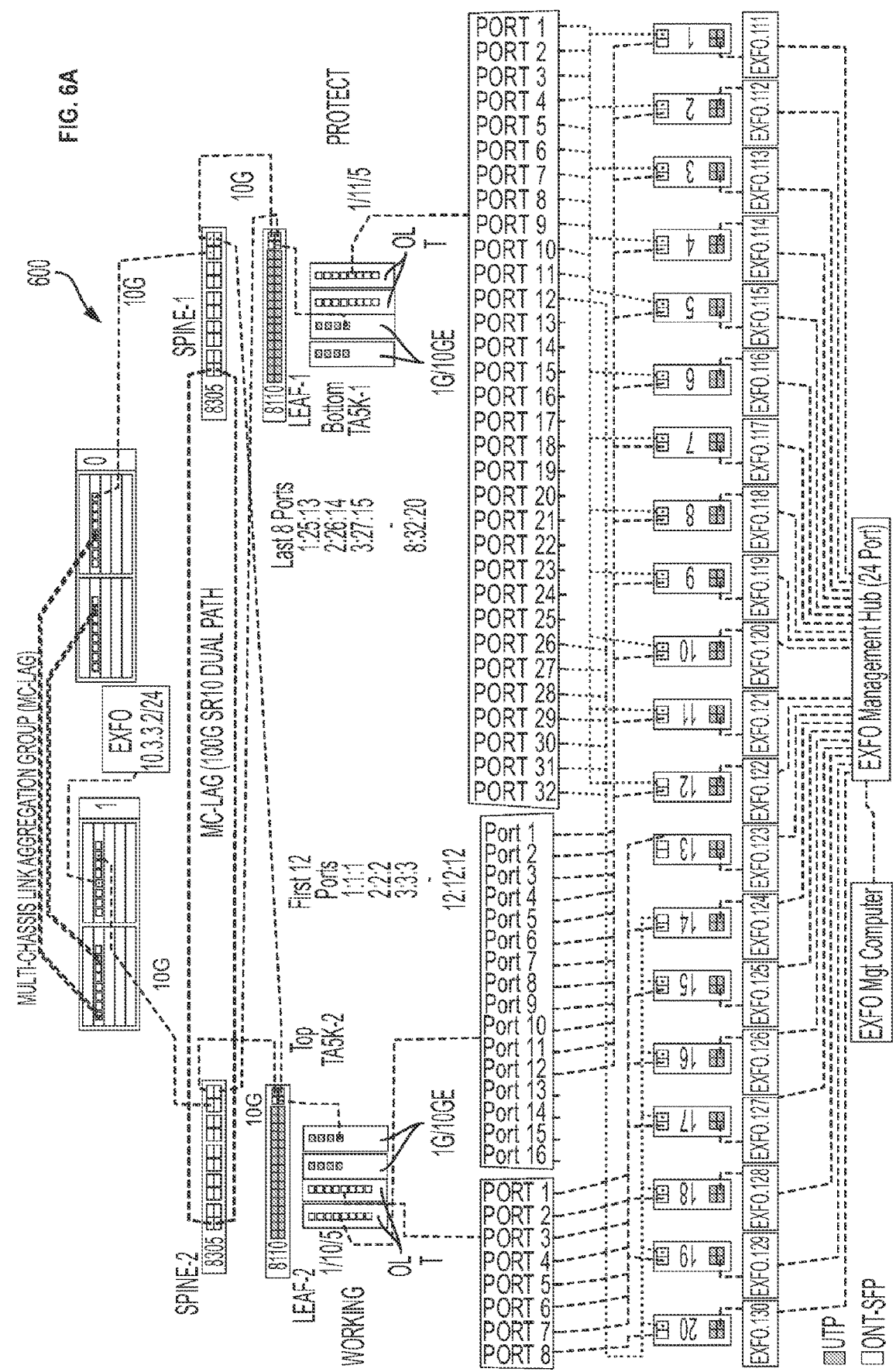
FIGS. 6A-6B show an example systems.
Figure 6B:
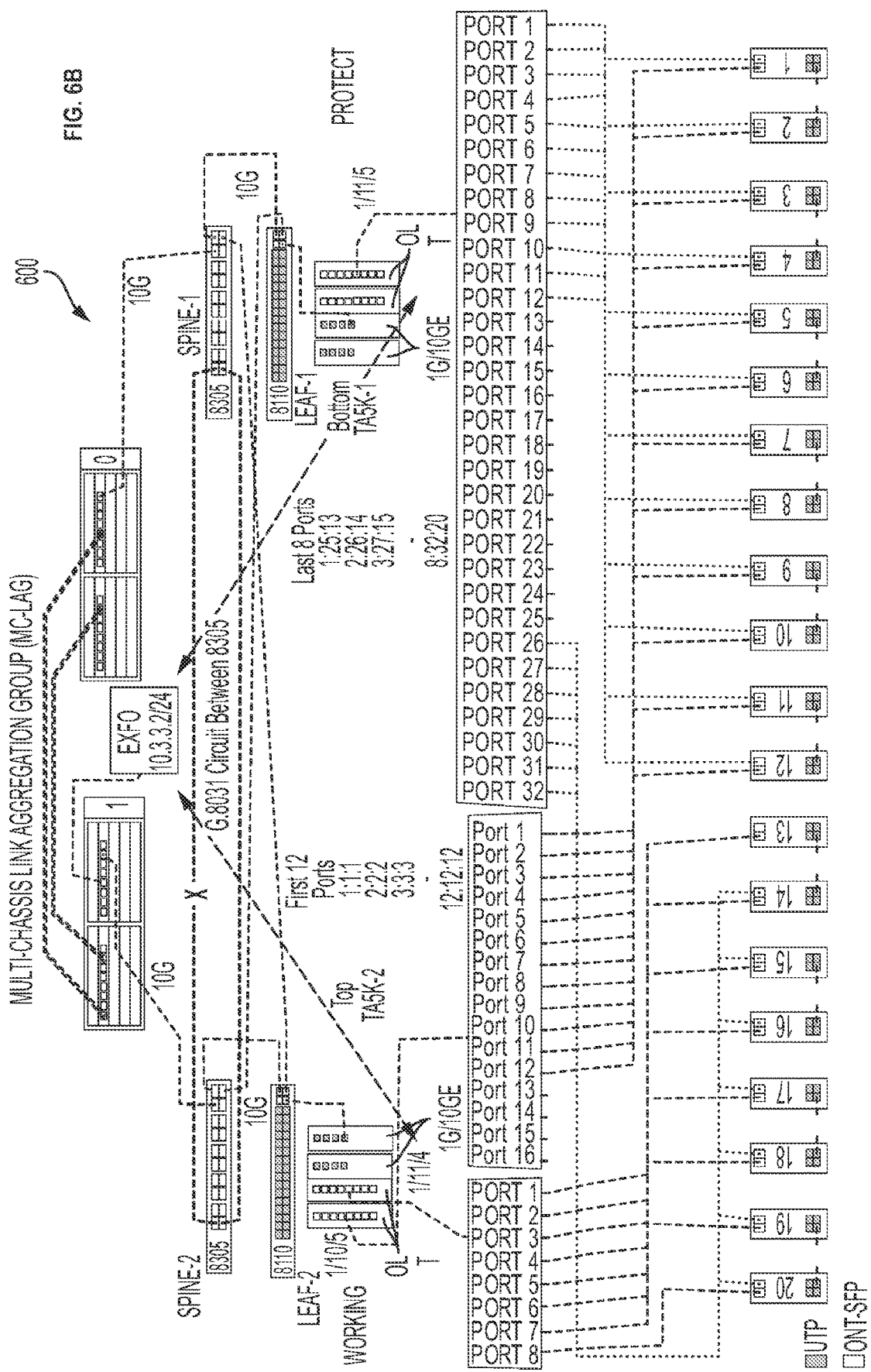

FIGS. 6A and 6B show an example testing configuration 600 of a passive optical network (PON) for utility infrastructure resiliency. The testing configuration 600 may be used to verify operations (e.g., redundancy/fail-over operations, etc.) of the systems described herein (e.g., the systems 100-300, etc.). The testing configuration 600 included a spine-leaf aggregation configuration between a PON OLT chassis and configured routers. The routers were used to simulate diverse substation/hut routers. Industry spine and leaf switches used. OLT modules are indicated as TA5K-1 and TA5K-2.

EXFO.10.3.3.2 simulates a device/server with a PON backbone infrastructure. Twenty (20) EXFO testers, 111-130, were configured with 20 Mbps, untagged traffic flows, to/from EXFO.10.3.3.2, totaling approximately 400 Mbps.

The twenty (20) EXFO testers, 111-130, were configured with 20 Mbps, untagged traffic flows between each other in a Peer-Peer communications scenario, simulating some DNP3 scenarios.

FIG. 6B provides a better illustration of the G.8031 domain. FIG. 6B illustrates the G.8031 relationship between the SPINE switches, in addition to and/or in substitution of the Multi-Chassis LAG group. Notably, the G.8031 domain is from the end-point (e.g. EXFO 130) to either SPINE-02 or SPINE-01 switch.

The testing configuration 600 was used to verify system configurations designed for failure-protected automatic restoration. Protection switching provides path level switching of 1GE, 10GE, and PON OLT port signal failure detection and protection.

FIG. 7 summarizes faults created within the testing configuration 600 and respective times to switch from active working path to standby protect path for the various points in the Distribution Automation testbed. The network configuration is comprised of SPINE-LEAF Aggregation Switches configured between the PON OLT chassis and Nokia Routers. The Nokia 7705 routers were used to simulate diverse substation/hut routers (e.g., the routing devices 323 and 324, etc.). Switching was accomplished, on average, within <5 milliseconds.

In an embodiment, illustrated in FIG. 8, any device/component described herein may be configured to perform a method 800 comprising, at 810, determining, by at least one optical communication node of a plurality of optical communication nodes in communication with an electrical substation power distribution system, a fault associated with a portion of a plurality of portions of a first fiber optic communication path associated with the power distribution system, wherein each optical communication node of the plurality of optical communication nodes is in communication with at least a portion of the plurality of portions of the first fiber optic communication path and at least one electrical power recloser associated with the at least the portion of the first fiber optic communication path.

At 820, causing, based on the fault, a connection to the portion of the first fiber optic communication path to switch to a connection to a portion of a plurality of portions of a second fiber optic communication path associated with the power distribution system.

At 830, causing the at least one electrical power recloser to associate an electric power connection associated with the portion of the first fiber optic communication path with the portion of the second fiber optic communication path.

At 840, causing information sent via at least another portion of the plurality of portions of the first fiber optic communication path to be sent via the portion of the second fiber optic communication path.

Figure 9:
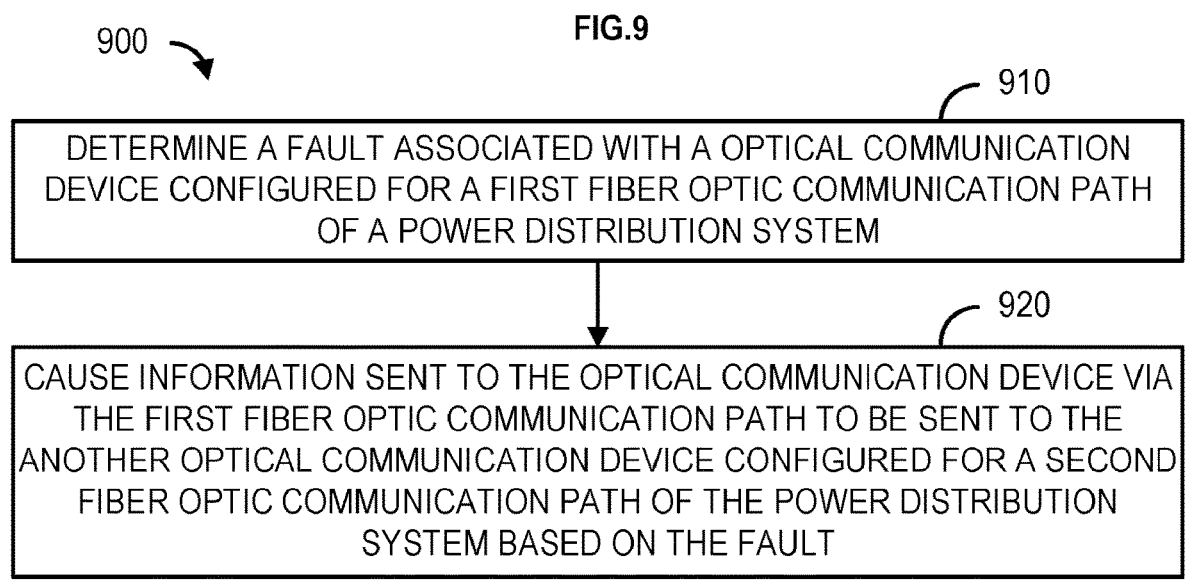
FIG. 9 shows an example method.

In an embodiment, illustrated in FIG. 9, any device/component described herein may be configured to perform a method 900 comprising, at 910, determining, by a first optical communication node of a plurality of optical communication nodes in communication with a substation power distribution system, a fault associated with a second optical communication node of the plurality of optical communication nodes, wherein the second optical communication node is associated with a portion of a plurality of portions of a first fiber optic communication path associated with the power distribution system.

At 920, causing, based on the fault, information sent to the second optical communication node via the first fiber optic communication path to be sent to the first optical communication node via a second fiber optic communication path associated with the power distribution system.

Figure 10:
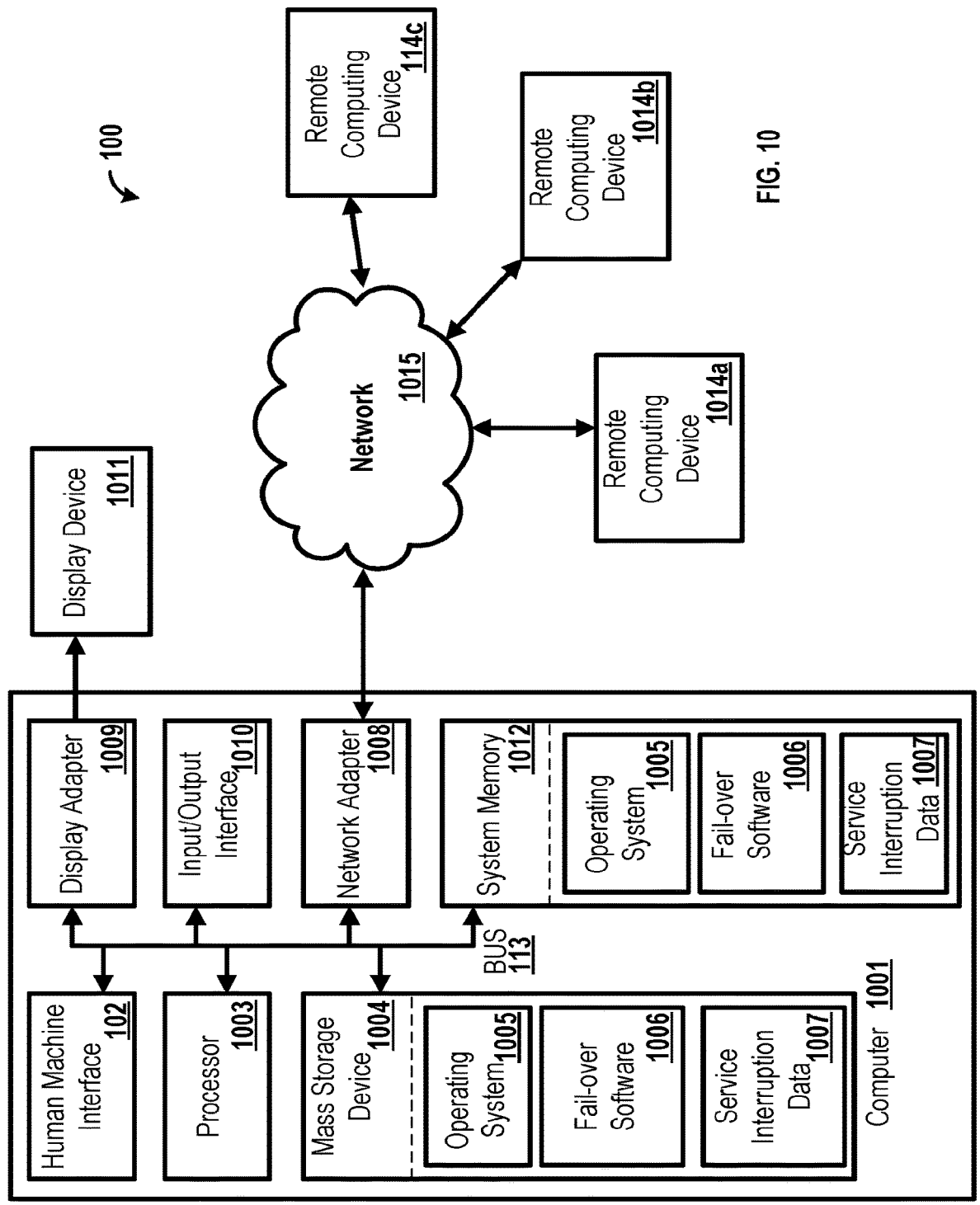
FIG. 10 shows a block diagram of a computing device for implementing example systems.

FIG. 10 shows a system 1000 for passive optical network (PON) for utility infrastructure resiliency. Any device/component described herein may be and/or include a computer 1001 as shown in FIG. 10.

The computer 1001 may comprise one or more processors 1003, a system memory 1012, and a bus 1013 that couples various components of the computer 1001 including the one or more processors 1003 to the system memory 1012. In the case of multiple processors 1003, the computer 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computer 1001 may operate on and/or comprise a variety of computer-readable media (e.g., non-transitory). Computer-readable media may be any available media that is accessible by the computer 1001 and comprises, non-transitory, volatile, and/or non-volatile media, removable and non-removable media. The system memory 1012 has computer-readable media in the form of volatile memory, such as random access memory (RAM), and/or non-volatile memory, such as read-only memory (ROM). The system memory 1012 may store data such as service interruption data 1007 and/or program modules such as operating system 1005 and fail-over software 1006 that are accessible to and/or are operated on by the one or more processors 1003.

The computer 1001 may also comprise other removable/non-removable, volatile/non-volatile computer storage media. The mass storage device 1004 may provide non-volatile storage of computer code, computer-readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 1004. An operating system 1005 and fail-over software 1006 may be stored on the mass storage device 1004. One or more of the operating system 1005 and fail-over software 1006 (or some combination thereof) may comprise program modules and the fail-over software 1006. Service interruption data 1007 may also be stored on the mass storage device 1004. Service interruption data 1007 may be stored in any of one or more databases known in the art. The databases may be centralized or distributed across multiple locations within the network 1015.

A user may enter commands and information into the computer 1001 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1003 via a human-machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 via an interface, such as a display adapter 1009. It is contemplated that the computer 1001 may have more than one display adapter 1009 and the computer 1001 may have more than one display device 1011. A display device 1011 may be a monitor, an LCD (Liquid Crystal Display), a light-emitting diode (LED) display, a television, a smart lens, a smart glass, and/or a projector. In addition to the display device 1011, other output peripheral devices may comprise components such as speakers (not shown) and a printer (not shown) which may be connected to the computer 1001 via Input/Output Interface 1010. Any step and/or result of the methods may be output (or caused to be output) in any form to an output device. Such output may be any form of visual representation, including, but not limited to, textual, graphical, animation, audio, tactile, and the like. The display 1011 and computer 1001 may be part of one device, or separate devices.

The computer 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 1001 and a remote computing device 1014*a,b,c* may be made via a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components may reside at various times in different storage components of the computing device 1001, and are executed by the one or more processors 1003 of the computer 1001. An implementation of fail-over software 1006 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
   determining, based on a first communication path configured for optical communication and switching with linear protection, a fault associated with the first communication path, wherein the first communication path comprises first optical nodes and an end point;
   causing, based on the fault, transfer of a connection of the first communication path to a connection of a second communication path, wherein the second communication path comprises second optical nodes and the end point; and
   causing, based on the transfer, the end point to transfer a power supply from the first communication path to the second communication path.

2. The method of claim 1, wherein the first communication path comprises a first portion and a second portion and the method further comprises:
   sending information intended for the first portion over the second portion.

3. The method of claim 1, wherein the end point is an electrical power recloser.

4. The method of claim 1, wherein the determining the fault is further based on a continuity check message.

5. The method of claim 1, wherein the end point is caused to transfer the power supply in less than or equal to 15 milliseconds.

6. The method of claim 1, wherein determining the fault is based on one or more signals of a protocol associated with Multi-Chassis Link Aggregation.

7. The method of claim 1, wherein the first optical nodes comprise a power distribution automation device.

8. The method of claim 1, wherein the first optical nodes comprise a communication hut.

9. The method of claim 8, wherein the communication hut comprises one or more of an optical line terminal device, a gigabit switch, a smart grid device, or a utility management device.

10. The method of claim 9, wherein the gigabit switch comprises one or more of a line gigabit switch or a spine gigabit switch.

11. The method of claim 1, further comprising:
    sending a notification indicating one or more of a location of the fault, a potential cause of the fault, or an estimated time to repair the fault.

12. An apparatus comprising:
    one or more processors; and
    a memory storing processor-executable instructions that, when executed by the one or more processors, cause the apparatus to:
       determine, based on a first communication path configured for optical communication and switching with linear protection, a fault associated with the first communication path, wherein the first communication path comprises first optical nodes and an end point;
       cause, based on the fault, transfer of a connection of the first communication path to a connection of a second communication path, wherein the second communication path comprises second optical nodes and the end point; and cause, based on the transfer, the end point to transfer a power supply from the first communication path to the second communication path.

13. The apparatus of claim 12, wherein the processor-executable instructions further cause the apparatus to:

send a notification indicating one or more of a location of the fault, a potential cause of the fault, or an estimated time to repair the fault.

14. A method comprising:

determining, based on a first communication path configured for optical communication and switching with linear protection, a fault associated with the first communication path, wherein the first communication path comprises first optical nodes and an end point;

causing, based on the fault, transfer of a connection of the first communication path to a connection of a second communication path, wherein the second communication path comprises second optical nodes and the end point;

causing, based on the transfer, the end point to transfer a power supply from the first communication path to the second communication path; and sending a notification indicating one or more of a location of the fault, a potential cause of the fault, or an estimated time to repair the fault.

15. The method of claim 14, wherein the end point is caused to transfer the power supply in less than or equal to 15 milliseconds.

16. The method of claim 14, wherein the first communication path comprises a first portion and a second portion and the method further comprises:

sending information intended for the first portion over the second portion.

17. The method of claim 14, wherein the end point is an electrical power recloser.

18. The method of claim 14, wherein determining the fault is further based on a continuity check message.

19. The method of claim 14, wherein determining the fault is based on one or more signals of a protocol associated with Multi-Chassis Link Aggregation.

* * * * *